July 11, 1967 — J. F. COPLIN ET AL — 3,330,117

BY-PASS GAS TURBINE JET ENGINE

Filed Oct. 11, 1965

Inventors
John Frederick Coplin
Philip Charles Ruffles
By
Cushman, Darby·Cushman
Attorneys

United States Patent Office 3,330,117
Patented July 11, 1967

3,330,117
BY-PASS GAS TURBINE JET ENGINE
John F. Coplin, Littleover, Derby, and Philip C. Ruffles, Derby, England, assignors to Rolls-Royce Limited, Derby, England, a British company
Filed Oct. 11, 1965, Ser. No. 494,766
Claims priority, application Great Britain, Nov. 7, 1964, 48,431/64
6 Claims. (Cl. 60—261)

ABSTRACT OF THE DISCLOSURE

A by-pass engine having provision for reheat combustion which includes intercalated sets of angularly spaced apart radially extending exhaust gas and by-pass air conduits, fuel injectors disposed both in the by-pass duct and in the turbine exhaust duct upstream of the inlet ends of the respective conduits, combustion stabilizers being provided solely in the turbine exhaust gas conduits for initiating combustion therein, and the fuel injected into the by-pass air burning in the hot turbine exhaust gases downstream of the outlets of said conduits.

---

This invention concerns a by-pass gas turbine jet engine.

According to the present invention, there is provided a by-pass gas turbine jet engine provided with a structure which is formed with two intercalated sets of angularly spaced apart radially extending exhaust gas and by-pass air conduits all of whose downstream ends communicate with the interior of the engine jet pipe, the upstream ends of the exhaust gas and by-pass air conduits being respectively arranged to receive the engine exhaust gases and the by-pass air, and means for effecting combustion of fuel in one of said sets of conduits.

The exhaust gas conduits may have combustion stabilising means mounted therein, fuel injection means being provided for injecting fuel into the exhaust gases upstream of the combustion stabilising means.

There may also be fuel injection means for injecting fuel into the by-pass air prior to the latter mixing with the exhaust gases in the jet pipe.

The fuel injection means are preferably disposed upstream of the said structure.

Baffle means are preferably provided for guiding the by-pass air smoothly from the engine by-pass passage into the by-pass air conduits and from the latter into the engine jet pipe.

A heat shield may be mounted in the jet pipe on the downstream side of the said structure and may be spaced from the jet pipe by an annular space, said annular space being supplied with by-pass air which has not passed through the by-pass air conduits.

The said heat shield may be provided with apertures to permit by-pass air to flow from the said annular space to the interior surface of the heat shield to effect film cooling thereof.

The sets of conduits are preferably defined by radially extending hollow struts by means of which an exhaust cone is supported within the jet pipe.

Figure 1:
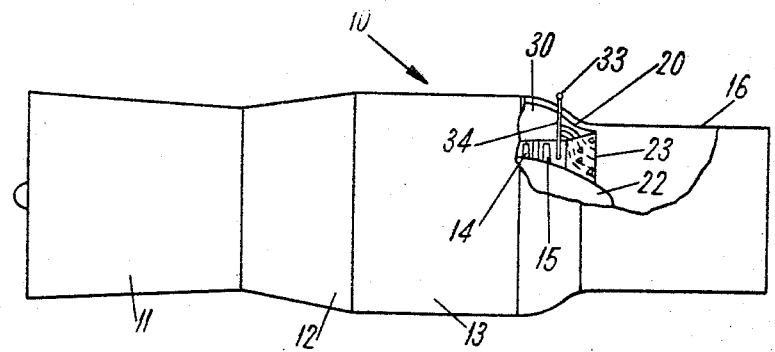
Figure 2:
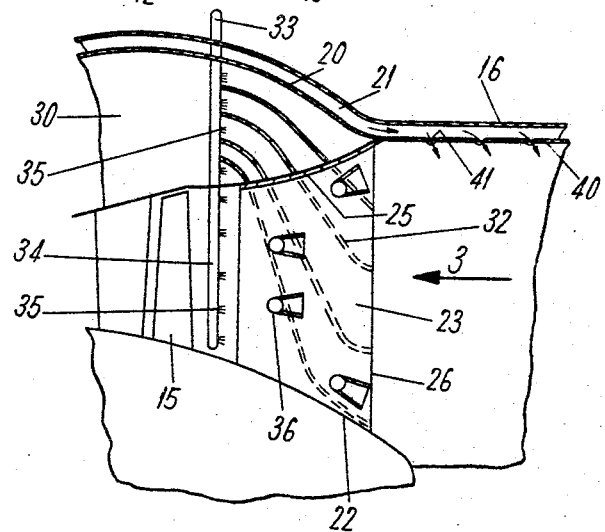
Figure 3:
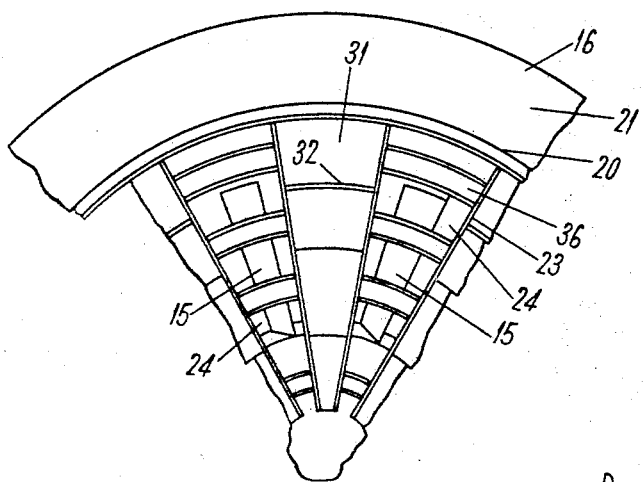

The invention is illustrated, merely by way of example, in the accompanying drawings, in which:

FIGURE 1 is a diagrammatic elevation, partly in section, of a by-pass gas turbine jet engine according to the present invention, FIGURE 2 is a broken-away sectional view showing part of the structure of FIGURE 1 on a larger scale, and FIGURE 3 is a broken-away view looking in the direction of the arrow 3 of FIGURE 2.

Referring to the drawings, a by-pass gas turbine jet engine 10 comprises in flow series, a low pressure compressor 11, a high pressure compressor 12, main combustion equipment 13, a high pressure turbine 14, a low pressure turbine 15, and a jet pipe 16.

Mounted within the jet pipe 16 is an inner casing 20 which is spaced from the jet pipe 16 by an annular space 21. An exhaust cone 22 is mounted within the inner casing 20 and is supported therefrom by way of a plurality of angularly spaced apart radially extending hollow struts 23.

The spaces between the struts 23 constitute exhaust gas conduits 24 whose upstream ends are open to receive the turbine exhaust gases and whose downstream ends communicate with the interior of the jet pipe 16.

The hollow struts 23 are apertured both at their radially outermost ends 25 and at their trailing edges 26.

Part of the air which has been compressed in the low pressure compressor 11 is supplied to a by-pass passage 30 which by-passes the high pressure compressor 12, the main combustion equipment 13, and the turbines 14, 15.

The interiors of the hollow struts 23 form by-pass air conduits 31 whose upstream ends are arranged to receive by-pass air from the by-pass passage 30 and whose downstream ends communicate with the interior of the jet pipe 16.

Thus, the struts 23 define two intercalated sets of angularly spaced apart radially extending exhaust gas and by-pass air conduits 24, 31.

A plurality of baffles 32 are provided for guiding the by-pass air smoothly from the by-pass passage 30 into the by-pass air conduits 31 and then from the latter into the interior of the jet pipe 16.

Mounted about the engine 10 is an annular fuel manifold 33 which is supplied with fuel by means not shown. A plurality of angularly spaced apart fuel pipes 34 extend radially inwardly from the fuel manifold 33 and are disposed immediately upstream of the struts 23. The fuel pipes 34 are provided with a plurality of radially spaced apart apertures 35 through which fuel is injected into both the by-pass air and the exhaust gases prior to their flowing through the by-pass air conduits 31, and the exhaust gas conduits 24 respectively.

Each of the exhaust gas conduits 24 has mounted therein a plurality of concentric downstream facing part-annular gutters 36 which are supported by the struts 23. The gutters 36 constitute combustion stabilising means for creating sheltered zones within which occurs combustion of the fuel which has been injected into the exhaust gas from the fuel pipes 34. As will be appreciated, the exhaust gas contains sufficient air to support the said combustion.

The fuel which has been injected into the by-pass air from the fuel pipes 34 is carried through the by-pass air conduits 31 and is burnt within the jet pipe 16 after the by-pass air has become mixed with the exhaust gases.

The part of the inner casing 20 on the downstream side of the struts 23 constitutes a heat shield 40, the annular space 21 between the heat shield 40 and the jet pipe 16 being supplied with by-pass air which has not passed through the by-pass conduits 31.

The heat shield 40 is provided with apertures 41 to permit by-pass air to flow from the annular space 21 to the interior surface of the heat shield 40 so as to effect film cooling thereof.

The struts 23 may, if desired, be cambered to remove outlet whirl caused by the turbines 14, 15.

The construction shown in the drawings has a number of advantages. Thus the by-pass air is employed to support combustion without the use of gutters 36 mounted in the flow of by-pass air. This enables a shorter and lighter jet pipe 16 to be employed. The flow of by-pass air is also not blocked by such gutters 36 and the consequential pressure loss is thus avoided.

The presence of the gutters 36 between the struts 23 reduces the effective cross sectional area of the upstream end of the jet pipe 16. There is therefore a larger ratio between the upstream and downstream ends of the jet pipe 16, whereby diffusion of the gases within the jet pipe 16 is improved with a consequential reduction in pressure loss.

If desired, the walls of the struts 23 may be corrugated to assist the mixing of the by-pass air with the exhaust gases.

We claim:

1. A by-pass gas turbine jet engine comprising: compressor means; a by-pass duct arranged to receive part of the air compressed in said compressor means; a jet pipe; a structure at the upstream end of said jet pipe, said structure comprising two intercalated sets of angularly spaced apart radially extending exhaust gas and by-pass air conduits, said conduits having downstream ends communicating with the interior of said jet pipe and respective upstream ends which receive engine exhaust gases and by-pass air respectively; combustion stabilizing means for effecting combustion of fuel in the exhaust gas conduits; and fuel injection means for injecting fuel into both the exhaust gas and by-pass air conduits simultaneously upstream of the respective downstream ends of said conduits.

2. A by-pass engine as claimed in claim 1 wherein said combustion stabilizing means are mounted in each exhaust gas conduit and upstream of the downstream end thereof, and the respective fuel injection means are disposed upstream of said combustion stabilizing means.

3. A by-pass engine as claimed in claim 2 wherein the respective fuel injection means are mounted upstream of said structure.

4. An engine as claimed in claim 2 in which the combustion stabilising means in each exhaust gas conduit comprise a plurality of concentric downstream-facing part-annular gutters.

5. An engine as claimed in claim 1 wherein baffle means are provided for guiding the by-pass air smoothly from the engine by-pass duct into the by-pass air conduits and from the latter into the engine jet pipe.

6. An engine as claimed in claim 1 wherein the sets of conduits are defined by radially extending hollow struts and the engine includes an exhaust cone which is supported within the jet pipe by said struts.

References Cited

UNITED STATES PATENTS

| 2,934,805 | 5/1960 | Gregory | 60—261 |
| 2,978,865 | 4/1961 | Pierce | 60—261 |
| 2,987,873 | 6/1961 | Fox | 60—261 |
| 3,043,101 | 7/1962 | Lefebvre | 60—261 |
| 3,100,627 | 8/1963 | Wilde | 60—261 |
| 3,118,276 | 1/1964 | Keenan | 60—262 |
| 3,163,982 | 1/1965 | Rice | 60—261 |

CARLTON R. CROYLE, *Primary Examiner.*

MARK M. NEWMAN, *Examiner.*